Aug. 26, 1930.   J. M. ROGERS   1,774,039
SAW SET
Filed July 13, 1928
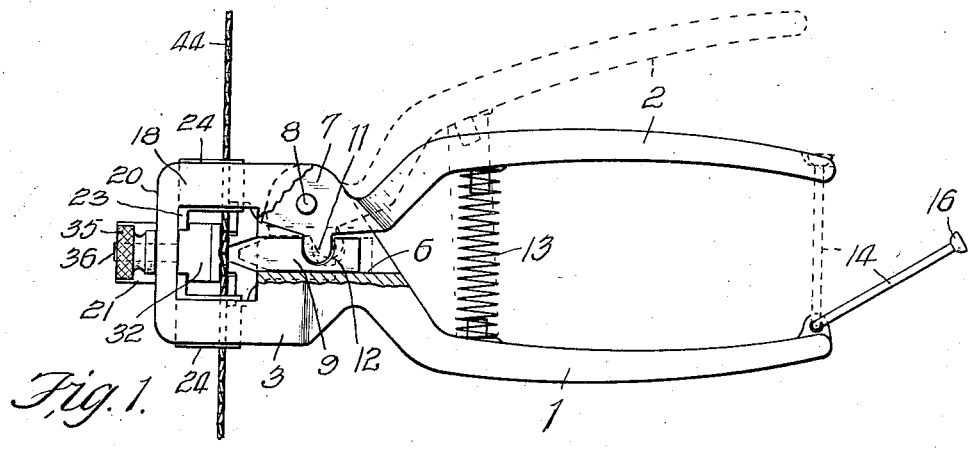
Fig. 1.
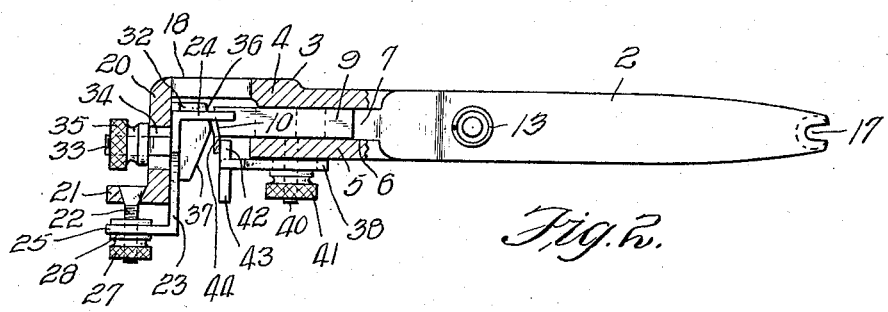
Fig. 2.
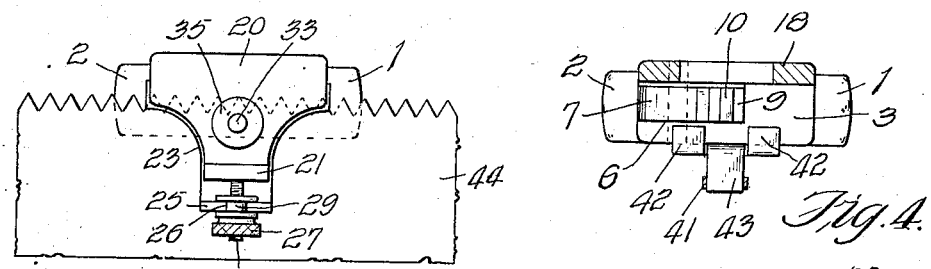
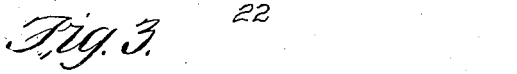
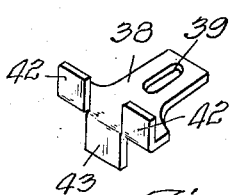
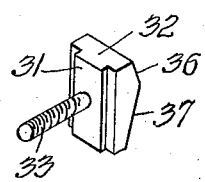
Fig. 4.
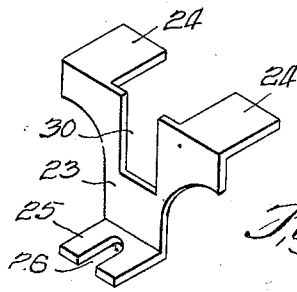
Fig. 3.
Fig. 6.
Fig. 7.
INVENTOR:
BY James M. Rogers.
ATTORNEY Patented Aug. 26, 1930

1,774,039

UNITED STATES PATENT OFFICE

JAMES M. ROGERS, OF ST. LOUIS, MISSOURI

SAW SET

Application filed July 13, 1928. Serial No. 292,338.

My invention relates to saw sets, and, it is a practical improvement to overcome certain practical objections to, and defects in the present types of saw sets.

An essential object of the invention is the provision of a saw set which when applied to a saw blade will assume a position at a right angle relative to the position of the saw blade, regardless of the position that the saw blade is held in.

A further object of the invention is the provision of a saw set wherein the handle lever movement of the device will always be longitudinally of the saw blade and not transversely thereof, as is the case with the present styles of saw sets, thus enabling the operator to observe the points of the saw teeth rather than one of the side faces thereof when the device is positioned upon a saw blade.

A further object of the invention is the provision of a saw tooth engaging gauge member which is vertically adjustable relative to a vertically adjustable anvil, thereby permitting the operator to accurately regulate the point at which the teeth are to be bent from to attain the required pitch therefor.

A further object of the invention is the provision of a saw blade rest member which is mounted for adjustment longitudinally of the device and toward or away from the anvil.

A still further object of the invention is the provision of an anvil having an upper and a lower beveled face, the lower beveled face permitting of a gradually wider passage between the anvil and the blade rest to allow saw teeth with plenty of set to be readily positioned and removed from between the anvil and the movable tooth pitching jaw.

A still further object of the invention is to provide an adjustable saw blade rest member having a vertically disposed blade engaging surface to provide a rest surface for a narrow saw blade, such as a keyhole, compass, small band, or jig saw and the like.

A still further object of the invention is the provision of a saw set which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views:

Fig. 1, is a top plan view of a saw set embodying the features of my invention, showing a portion thereof as broken away and as applied to a saw blade.

Fig. 2, is a side elevation of the device as applied to a saw blade with one of the levers broken away and with a portion of the head portion of said lever shown in cross-section.

Fig. 3, is a front end elevation of the device and shown as positioned upon a saw blade.

Fig. 4, is a sectional view taken through the head portion of the device looking toward the handles thereof.

Fig. 5, is a view in perspective of the vertical adjustable saw teeth engaging gauge member.

Fig. 6, is a view in perspective of the saw blade rest member.

Fig. 7, is a view in perspective of the anvil.

In carrying out the aim of my invention, I employ two handle-levers designated 1 and 2.

The handle lever 1 is provided at one end with a head portion 3. One side of the head portion is bifurcated to provide the upper and lower side jaws 4 and 5, respectively and the passage 6 therebetween. The passage 6, which is horizontally disposed, is adapted to receive the head portion 7 of the handle-lever 1, which head portion 7 is pivoted, as at 8. A tooth setting member 9 having the beveled end face 10 is slidably mounted in the passage 6 and it is disposed between the head portion 7 of handle-lever 2 and the head portion 3 of the handle-lever 1, as clearly shown in Figs. 1 and 4. The inner side face of the head portion 7 of the handle-lever 2 is provided with a laterally directed tongue 11 which is receivable in a recess 12 in one of the side faces of the tooth setting member 9 so that upon movement of the handle-lever 1 from the position shown in dotted lines in Fig. 1 to the position shown in full lines in Fig. 1, the tooth setting member 9 will be moved from its dotted line position in Fig. 1 to the full line position shown in Fig. 1. A coiled spring connection 13 is provided for the handle-levers 1 and 2 to move them apart and hold them apart, as shown in dotted lines in Fig. 1, until they are moved toward each other by gripping them with the hand, to the position shown in full lines in Fig. 1.

As shown in Fig. 1, the free ends of the handle-levers 1 and 2 may be connected by means of the connecting member 14, which is hingedly connected at one end, as at 14, to handle-lever 1. The opposite end of the connecting member 14 is provided with a head 16 and the handle-lever 2 is provided with a recess 17 to receive that portion of the connecting member 14 adjacent the head 16 when it is desired to lock the handle-levers in the position shown in full lines in Fig. 1, such as when placing the device in a tool box or other storage place.

The head portion 3 of the handle-lever 1 including the upper jaw portion 4 thereof is provided with a forward top extension 18 which is of less thickness than the head portion 3 of handle-lever 1 and which is provided with a rectangular or other suitably shaped sight opening 19. The forward edge of the top extension is directed downwardly at a right angle thereto to provide a front wall 20 which is suitably spaced from the front face of the head portion 3, as clearly shown in Fig. 2. The front wall 20 of the head extension 18 is finally bent forwardly at its lower end to provide the lip 21 from which extends downwardly a screw threaded stud 22.

Mounted upon the inner face of the front wall 20 is a gauge, or guide member 23. This gauge member is provided at its upper edge with the spaced ears 24 which extend from the gauge member at a right angle thereto. The lower end of the gauge member 23 is bent forwardly to provide the ear 25 having a slotted recess 26. The stud 22 is provided with a knurled nut 27 which is provided with a peripheral groove 28 to form a neck 29 which is receivable in the slotted recess 26 to raise and lower the guide member 23 upon turning movement of the nut 27. The gauge member 23 is provided with a cutaway portion 30 to receive the rib 31 of an anvil 32 which anvil is mounted upon the inner face of the guide member 23 as shown in Figs. 1 and 2. The anvil 32 is provided with a forwardly directed screw threaded stud 33 which passes through a vertically slotted opening 34 in the front wall 20 and it is provided with a knurled nut 35 for holding the anvil in any of its vertically adjusted positions relative to the vertically adjustable gauge member 23. The anvil 32 is provided upon its inner face with the upper beveled face 36 and the lower beveled face 37.

The lower face of the head portion 3 of the handle-lever 1 is provided with a rest member 38 having a slotted opening 39 through which passes a screw threaded stud 40 fixed to the head portion 3. The stud is provided with a knurled nut 41 for holding the rest member in any of its possible adjusted positions. The front edge of the rest member 38 is provided with a pair of spaced upwardly directed saw blade engaging members 42 and with a single downwardly directed saw blade engaging member 43, as clearly shown in Figs. 2 and 6.

It will be observed from the drawings, that the saw set is disposed at a right angle to the vertical position of the saw blade 43, as shown in Figs. 1, 2 and 3, so that the movement of the handle-levers 1 and 2 will be in a horizontal plane relative to the plane of the saw blade, thus permitting the use of the tool in a most natural way and giving ease of operation at almost any position in which a saw blade may be held to secure proper light to the tooth to be set. Regardless of the position of the saw blade, the tool is always disposed at a right angle relative thereto and the movement of the handle-levers 1 and 2 are always longitudinally of the saw blade and never transversely thereof.

It is believed that the foregoing description, taken in connection with the drawing, will fully set forth the construction, operation and advantages of the improvement to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. A saw set having pivoted handle-levers movable in a horizontal plane in the action of setting a saw tooth, a longitudinally movable tooth setting member, a vertically adjustable guide member having spaced arms adapted for contact with the pointed ends of saw teeth adjacent each side of the saw tooth being set for gauging the point at which the teeth should be set from, a rest member having upwardly and downwardly directed arms adapted for contact with one face of a saw blade adjacent the tooth being set and an anvil adjustably mounted upon the gauge member.

2. A saw set having pivoted handle-levers movable in a horizontal plane and at a right angle to the plane of a saw blade, a saw tooth setting member, means for imparting longitudinal movement thereto, a vertically adjustable gauge member for regulating the point from which the saw teeth should be set, a vertically adjustable anvil mounted on the gauge member, and horizontally adjustable saw blades rest member having upwardly and downwardly directed blade engaging arms supported by one of the handle-levers.

3. A saw set provided with an anvil and a tooth setting member having in combination therewith a vertically adjustable gauge plate consisting of body member engagingly mounted upon the saw set, a screw threaded stud depending from the saw set, a nut carried by the stud for adjustably supporting the body member, spaced saw teeth engaging members for gauging the depth of the set of the saw teeth and an anvil mounted for vertical adjustment upon said body member.

4. A saw set provided with an anvil and a tooth setting member having in combination therewith a vertically adjustable gauge plate consisting of a body member engagingly mounted upon the saw set, a screw threaded stud depending from the saw set, a nut carried by the stud for adjustably supporting the body member, spaced saw teeth engaging members for gauging the depth of the set of the saw teeth, an anvil mounted for vertical adjustment upon said body member and a horizontally adjustable saw blade rest member carried by the lower face of the saw set.

5. A saw set comprising two pivotally associated handle-levers adapted for movement in a horizontal plane during the action of setting a saw tooth, a gauge plate carried by one of said handle-levers adapted to contact with the pointed ends of the saw teeth opposite both sides of the saw tooth to be set, an anvil mounted for vertical adjustment upon said gauge plate, a saw blade rest plate carried by said handle-lever, a tooth setting member and means actuated by one of the handle-levers for imparting longitudinal movement to said tooth setting member.

6. A saw set comprising a head member having an opening therein, a gauge plate adapted to contact with the pointed ends of the saw teeth adjacent the tooth to be set, an anvil mounted for vertical adjustment upon said gauge plate, a handle lever directed from said head member, a second handle-lever pivoted to said head member, a tooth setting member actuated by said second handle-lever and a saw blade rest member carried by said head member, the aforesaid handle-levers adapted to be actuated in a horizontal plane and at a right angle to the position of the saw blade.

7. In a saw set, the combination of two pivotally associated handle-levers adapted for movement in a horizontal plane, a head portion at one end of one of the handle-levers, a tooth setting member longitudinally movable in said head portion, a tongue and groove connection between one of the handle-levers and the tooth setting member, a head extension having a sight opening directed forwardly from said head portion, a front wall member directed downwardly from said head extension, a flange at the lower end thereof, a screw threaded stud directed downwardly from said flange, a nut carried by said stud, a vertically adjustable gauge member supported by said nut, spaced members directed from the upper edge of said gauge member adapted for contact with the pointed ends of the teeth of a saw blade, an anvil carried by the front wall having one of its sides provided with two beveled faces, means to permit vertical adjustment of the anvil and a saw blade rest member adjustably mounted upon the lower face of the aforesaid head portion, said member having a pair of spaced upwardly directed arms and an intermediate downwardly directed arm.

8. In a saw set structure, a handle member, a head portion extending from one end of the handle member and provided with an enlarged vertically disposed sight opening, a wall member depending from the front edge of said head portion and disposed at a right angle thereto, a flange directed forwardly from the lower edge of said wall member, a screw threaded stud directed downwardly from said flange, a peripherally grooved nut carried by said stud, a gauge member supported by said nut and vertically adjustable through the turning action of said nut, an anvil having diverging faces slidably mounted upon said gauge plate, means to prevent rotary displacement of the anvil, means for supporting said anvil and permitting of vertical adjustment thereof relative to the gauge plate, a saw blade rest member horizontally adjustable upon the lower face of the head portion of the handle member, said rest member having one end thereof provided with a pair of spaced upwardly directed arms and an intermediate downwardly directed arm, a tooth setting member mounted for movement in the head portion of said handle member with its setting end visible through the aforesaid sight opening, a handle lever pivoted to the head portion of the handle member and a tongue and groove connection between the handle lever and the tooth setting member for imparting longitudinal movement to the tooth setting member upon horizontal movement of the handle lever relative to the handle member.

In testimony whereof, I have hereunto affixed my signature.

JAMES M. ROGERS.